United States Patent Office 3,128,783
Patented Apr. 14, 1964

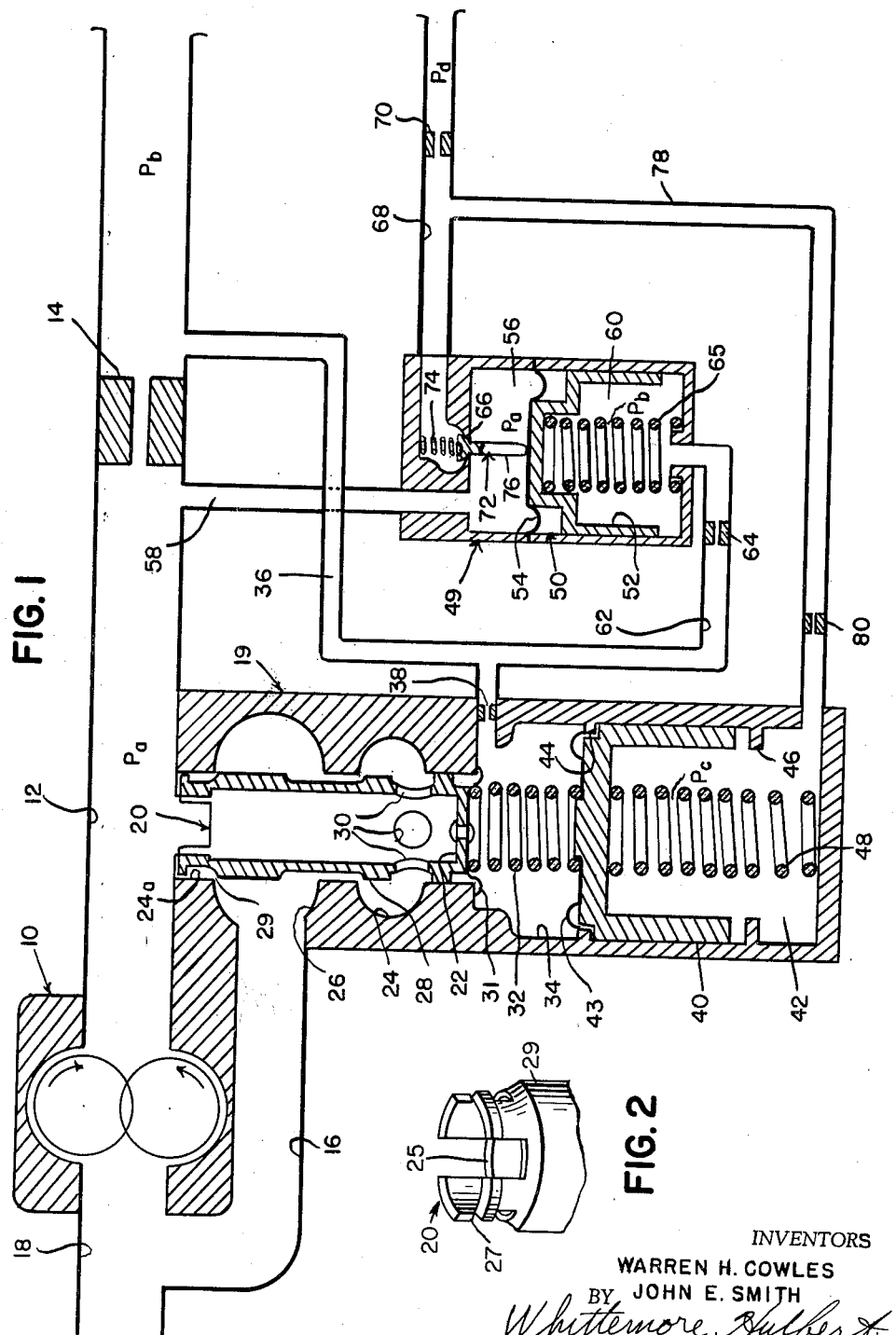

3,128,783
BYPASS VALVE WITH LIMITED RESET
Warren H. Cowles, Detroit, and John E. Smith, St. Clair Shores, Mich., assignors to Holley Carburetor Company, Van Dyke, Mich., a corporation of Michigan
Filed Feb. 11, 1957, Ser. No. 639,294
3 Claims. (Cl. 137—117)

The present invention relates to a bypass valve with limited reset.

It is an object of the present invention to provide a pressure regulating bypass valve having means associated therewith to provide accurate pressure control throughout a required range.

It is a further object of the present invention to provide a pressure regulating bypass valve characterized by improved accuracy of the metering differential right at the most critical points; i.e., just before and just after the metering area.

It is a further object of the present invention to provide the improved reset feature in a pressure regulating bypass valve while retaining the desirable features and reliability of a simple bypass valve.

It is a further object of the present invention to provide a pressure regulating bypass valve which is "fail safe" by reason of limitation of the range of resetting.

More particularly, it is an object of the present invention to provide a pressure regulating valve including spring means and fluid pressure responsive means operable to eliminate errors attributable to the spring rate.

Still more specifically, it is an object of the present invention to provide a pressure regulating valve, a bias spring operatively connected to the valve, and pressure responsive means operably connected to the spring to maintain its bias action on the valve at a uniform value despite movement of the valve.

It is a further object of the present invention to provide a bypass valve for maintaining pressure drop across a restriction at a uniform value including means for subjecting the valve to opposed pressures dependent upon the values of the pressure existing at opposite sides of the restriction, a spring connected to the valve to assist the lower value pressure, and spring adjusting means responsive to the pressure drop across the restriction for maintaining the effectiveness of the spring at a substantially constant value in spite of movement of the valve.

Other objects and features of the invention will become apparent as the description proceeds, especially when taken in conjunction with the accompanying drawing, illustrating a preferred embodiment of the invention, wherein:

FIG. 1 is a diagrammatic sectional view of the bypass valve.

FIG. 2 is an enlarged pictorial view of the top part of the valve element.

Stated in general terms, the problem may be considered as controlling a pressure difference across a metering orifice in a fluid flow line. In the past, this has been accomplished by providing a bypass flow of fluid in a passage controlled by a bypass valve having a diaphragm and connected to respond to the fluid pressure at opposite sides of the restriction and provided with a spring. Such a valve is subject to three principal forces: (1) the spring force tending to close the valve, (2) the force due to pressure difference across the valve and diaphragm, and (3) the hydro-dynamic forces due to momentum of the fluid acting on the metering surfaces of the valve.

Therefore it becomes apparent that a conventional bypass valve can only hold across itself a pressure difference which is equal to the sum of the spring force (which varies with valve travel) plus or minus (depending on the direction of flow of fluid) the hydro-dynamic force divided by the effective area of the valve and diaphragm. This pressure difference is certain to vary from that directly across the restriction.

Another source of error in prior bypass valve installations is the location of the valve at a distance from the metering orifice or restriction, which is ordinarily desirable from design considerations. This error may be a few percentage points.

In accordance with the present invention, there is provided a pressure senser connected directly across the restriction and which is therefore sensitive to the exact pressure drop at this area. The senser may be separated from the bypass valve, which may therefore be located at a more convenient location in the system. The passages connecting the senser will be much smaller than the bypass passage and valve, and the latter may thus be located remote from the restriction without sacrificing metering accuracy in controlling the pressure differential across the restriction.

Accordingly, the desirable features of the conventional bypass valve are retained; i.e., reliability because of its simplicity, and stability and speed of response. The response is a simple first order lag.

The device is designed to be "fail safe" in that the amount of possible reset is limited by positive stops. The stops are positioned to limit resetting of the valve spring to just enough to wash out any errors which could occur with a simple bypass valve. This is ordinarily about 4% so that in the event of failure the maximum differential error could never exceed about 8%.

The present invention is applied to a system including a pump such as the gear pump 10 discharging into a passage 12 having a metering orifice 14 therein. In practice the orifice 14 is ordinarily adjustable but for purposes of illustration herein, it is shown as a fixed orifice providing a constant restriction in the passage 12. A bypass passage 16 is provided for returning fluid from the discharge side of the pump to the inlet side 18 thereof. Bypass flow of fluid is controlled by means of a bypass valve 19 including a hollow valve element 20 having a closed end 22 subjected to pump pressure $P_a$ on the inside of the valve element 20. The bypass valve 20 is slidable vertically as seen in FIG. 1, in a cylindrical passage enlarged to provide chambers 24 and 26. A pair of diametrical slots 25 and 27 are located in the upper portion of the valve element 20 as shown in FIG. 2 so as to alternately divide the upper part of the valve into solid and slotted portions thus permitting fluid from passage 12 to flow through the slots and around the valve element into chamber 24a. The depth of the slots 25 and 27 is determined by the size of the annular valving portion 29 in relation to the depth of the chamber 24a. Increases in pressure in passage 12, as will be explained in detail herein later, act against the valve element so as to depress the element and to increase the size of the slots exposed to the chamber 26. The valve includes annular valving portions 28 and 29 controlling flow from chambers 24 and 24a to chamber 26. Fluid under pump pressure $P_a$ is at all times present in the chamber 24 as a result of the provision of ports 30 in the valve. Preferably, an annular flexible diaphragm 31 is provided to limit leakage and dirt contamination problems.

Engaging the lower end of the valve element 20, as seen in FIG. 1, is a compression spring 32 which is received in a chamber 34. A passage 36 connects the chamber 34 to the passage 12 at a point downstream from the orifice 14. The passage 36 is provided with a restrictor 38. Accordingly, the chamber 34 is subjected to pressure existing in the passage 12 downstream from the orifice 14 and as a result, the valve element 20 is urged downwardly or toward open position by pump pressure $P_a$ and is urged upwardly or toward closed position by a smaller pressure $P_b$ existing downstream from the orifice 14. The valve element 20 will accordingly move to a position such that the pressure drop across the orifice 14 is sufficient to produce pressure differentials whose resultant force on the valve element 20 is equal to the force of the spring 32 thereon. If the spring 32 were a zero rate spring the structure so far described would operate to produce a constant pressure drop across the orifice 14, except for variations induced by the hydro-dynamic forces on the bypass valve. However, no such spring is available and in order to eliminate pressure errors due to both spring rate and hydrodynamic forces and to accomplish the desired result the present invention provides means for adjusting the effectiveness of the spring in accordance with the pressure drop across the orifice 14.

This means comprises essentially a reset piston 40 which serves as a movable or adjustable seat for the spring 32. The piston 40 is movable in a cylinder, the upper portion of which constitutes the chamber 34 and the lower portion of which constitutes a chamber 42. Preferably, the reset piston 40 is connected to the cylinder by a flexible diaphragm 43. The cylinder includes inwardly extending stops 44 and 46 to limit axial movement of the reset piston 40 so that in the event of failure in another part of the system, the reset piston can move only a limited amount. The entire system is therefore adapted to "fail safe," since anywhere within its range of movement determined by the stops 44 and 46, the reset piston will serve adequately as a seat for the spring 32.

The reset piston 40 is urged upwardly by a compression spring 48 which assists a variable controlled fluid pressure $P_c$ within the chamber 42 to balance the forces developed by fluid pressure within the chamber 34. A senser unit 49 including a cylinder 50 is provided having a piston 52 therein which is movable vertically in the cylinder and connected thereto by a flexible diaphragm indicated at 54. The piston 52 thus separates the cylinder 50 into an upper chamber 56 which is connected to pump pressure $P_a$ through a passage 58, and a lower chamber 60 which is subjected to pressure $P_b$ by a conduit 62 having a restrictor 64 therein. A compression spring 65 is provided in the chamber 60 biasing the piston 52 upwardly. The chamber 56 has a valve port 66 therein communicating with a passage 68 having a flow restricting orifice 70 therein. Associated with the valve port 66 is a small servo valve 72 having a light bias spring 74 urging it toward closed position and having a projection 76 engageable with the upper end of the piston 52. The bias of the spring 74 is sufficient to counteract the effect of the pressure differential $P_a$ minus $P_c$ on the servo valve 72 because of the small areas involved.

The piston 52 is accordingly in equilibrium when the pump pressure $P_a$ exerts a force on its upper end equal to the sum of the forces exerted by the pressure $P_b$ within the chamber 60 and the spring 65. Movement of the piston 52 results in corresponding movement of the servo valve 72 and accordingly, results in a change in the variable restriction or orifice provided in the passage 68 by the servo valve 72. Since pressure $P_a$ is the highest pressure in the system, or, to be more universal, since a pressure $P_d$ existing in the passage 68 downstream from the fixed orifice 70, is lower than the pressure $P_a$, there will be a small flow through the variable orifice provided by the servo valve 72, and the orifice 70. Accordingly, the pressure $P_c$ existing between the servo valve 72 and the orifice 70 has a value between $P_a$ and $P_d$. The exact value of the pressure $P_c$ depends upon $P_d$. The exact value of the pressure $P_c$ depends upon the valves of $P_a$ and $P_d$ and also the restriction afforded by the opening of the servo valve 72, since orifice 70 is a fixed area orifice. It will further be apparent that the actual value of the variable orifice or opening afforded by the servo valve 72 may be controlled by the shape of the projection 76 on the valve, which extends through the valve port 66. The pressure $P_c$ is transmitted to the chamber 42 through a passage 78 having a restrictor 80 therein. The restrictors 64 and 80 are useful in establishing the proper dynamics of the system and will be selected as required for each application.

The effectiveness of the spring 48 will have a value depending upon the relative values of the pressures $P_a$, $P_b$ and $P_d$ and the areas of the valve 20 and reset piston 40, and if these latter values are properly selected, the spring 48 may be dispensed with.

From the foregoing it is apparent that the pressure $P_c$ has been established as a function of the position of the piston 52 which because of the fixed area of the piston and the force of the spring 65 is in turn a function of the pressure differential $P_a$ minus $P_b$. It is therefore possible to employ the variable and controlled pressure $P_c$ as a means for selectively adjusting the effectiveness of the spring 32. It is thus possible to obtain a substantially constant or selectively controlled pressure differential $P_a$ minus $P_b$ as will be apparent from the following considerations: A positive change or increase in the pressure differential $P_a$ minus $P_b$ makes for a positive change or increase in the opening of the bypass valve 20, which in turn makes a positive change or increase in the induced spring load of the spring 32. This same positive change or increase in the pressure differential $P_a$ minus $P_b$ through the servo system results in a negative change or decrease in the area opening of the servo valve 72 which in turn makes a negative change or reduction in the modulating pressure $P_c$. The reduction of the value of the pressure $P_c$ in the chamber 42 effects a downward adjustment of the reset piston 40 and this in turn makes a negative change or reduction in the load on the spring 32. With the parts properly proportioned this reduction in the load on the spring 32 resulting from a particular change in pressure differential $P_a$ minus $P_b$ may exactly cancel the increase in load on the spring attributable to the initial downward movement of the bypass valve 20. Accordingly, the value of the pressure drop across the orifice 14 may by the present system be maintained at a value which is constant by the elimination of errors attributable to changes in the effectiveness of the spring 32 due to movement of the bypass valve 20.

Inasmuch as the piston 52 will always be in the same identical position when the required pressure drop exists across the orifice 14, it follows that the variable orifice afforded by the servo valve 72 will likewise be at a constant definite value. Therefore, the modulating pressure $P_c$ existing within the chamber 42 at any time when the pressure drop across the orifice 14 is as required, will be a direct function of the pressure $P_a$. On the other hand, the piston 52 is movable up or down in response to a decrease or increase respectively in pressure drop across the orifice 14 with a corresponding change in the effectiveness of the orifice provided by the valve 72. The resulting modulation of the pressure $P_c$ will cause the reset piston 40 to move to and remain in an adjusted position while the piston 52 returns to the position which it occupies when the pressure drop across the orifice 14 is as required. In other words, the bypass valve 20 moves to a position which bypasses the required amount of fluid to produce the desired pressure drop across the orifice. At the same time, reset piston 40 moves to and remains at a corresponding position designed to maintain the effectiveness of the spring 32 constant. When the bypass valve 20 and the reset piston 40 are in adjusted position, the piston 52 will be in the position corresponding to required pressure drop across the orifice 14.

The drawing and the foregoing specification constitute a description of the improved bypass valve with limited reset in such full, clear, concise and exact terms as to enable any person skilled in the art to practice the invention, the scope of which is indicated by the appended claims.

What we claim as our invention is:

1. A pressure regulating system controlling the pressure drop $P_a-P_b$ across an orifice located in a conduit of a hydraulic circuit wherein $P_a$ is the pressure in the conduit upstream of the orifice and $P_b$ is the pressure in the conduit downstream of the orifice, said pressure regulating system comprising a bypass valve assembly including a movable bypass valve adapted to be connected at one side to the pressure $P_a$ in the conduit, a housing, a movable wall forming a resettable spring seat spanning the interior of said housing and dividing said housing into a pair of compartments, a spring in one of said compartments engageable with said spring seat and the other side of said bypass valve and acting in a direction to close said valve, a servo valve assembly including a housing having a movable wall therein which divides said housing into a pair of chambers, a valve port in said last-mentioned housing in fluid communication with one of said chambers, first passage means adapted to connect the pressure $P_b$ to the other of said chambers and also to said one compartment tending to cause movement of said spring seat in a direction to decrease the effectiveness of said spring, second passage means adapted to connect the pressure $P_a$ to said one chamber, third passage means connected to said valve port and having a fixed restriction therein, a movable servo valve cooperating with said valve port to form a variable orifice in said third passage means, said variable orifice and said fixed restriction being located in series in said third passage means with the pressure intermediate said variable orifice and said fixed restriction being $P_c$ and the pressure downstream of said fixed restriction being $P_d$, the differential pressure across the wall in said servo valve assembly being effective to control the position of the servo valve relative to said valve port to determine the size of said variable orifice, and fourth passage means connected to said third passage means at a point intermediate said variable orifice and said fixed restriction and to the other of said compartments so as to also subject said spring seat to pressure $P_c$ whereby said spring seat is reset in accordance with a change in the pressure differential $P_b-P_c$, the pressure $P_c$ intermediate said variable orifice and said fixed restriction constituting a modulated fluid pressure which is less than pressure $P_a$ but greater than pressure $P_d$, said servo valve being moved towards a closed position whenever the pressure differential $P_a-P_b$ across the wall in said servo valve assembly increases.

2. The pressure regulating system defined in claim 1 wherein mechanical means are provided in said first-mentioned housing for limiting the resetting of said spring seat thereby providing a fail safe system.

3. The pressure regulating system defined in claim 2 wherein said mechanical means includes positive stop means on each side of said spring seat for limiting the range of resetting of said spring seat.

References Cited in the file of this patent

UNITED STATES PATENTS

| | | |
|---|---|---|
| 1,302,538 | Gulick | May 6, 1919 |
| 1,521,765 | Guerrant | Jan. 6, 1925 |
| 1,976,820 | Wettstein | Oct. 16, 1934 |
| 2,109,958 | Finley | Mar. 1, 1938 |
| 2,308,124 | Stettner | Jan. 12, 1943 |
| 2,445,544 | Trautman | July 20, 1948 |
| 2,472,176 | Stern | June 7, 1949 |
| 2,483,426 | Moore | Oct. 4, 1949 |
| 2,496,577 | Cahill | Feb. 7, 1950 |
| 2,649,688 | Slomer | Aug. 25, 1953 |
| 2,957,488 | Farkas | Oct. 25, 1960 |

FOREIGN PATENTS

| | | |
|---|---|---|
| 160,327 | Switzerland | May 16, 1933 |
| 585,032 | Great Britain | Jan. 29, 1947 |
| 250,165 | Switzerland | June 1, 1948 |
| 1,130,564 | France | Oct. 1, 1956 |